United States Patent [19]

Go et al.

[11] Patent Number: 4,972,184
[45] Date of Patent: Nov. 20, 1990

[54] POLLING SYSTEM FOR USE IN AN AUDIO SYSTEM

[75] Inventors: Yasunao Go; Chiaki Hirano; Shigeto Mori; Masanori Kurosaki; Akira Hayama; Youichi Yamazaki; Toshiyuki Kimura; Yoshio Aoyagi, all of Kawagoe, Japan

[73] Assignee: Pioneer Electronic Corporation, Tokyo, Japan

[21] Appl. No.: 304,611

[22] Filed: Feb. 1, 1989

[51] Int. Cl.$^5$ ............................................. H04Q 9/00
[52] U.S. Cl. ........................... 340/825.25; 340/825.08; 370/85.8
[58] Field of Search ...................... 340/825.25, 825.06, 340/825.07, 825.08, 825.51, 825.52; 370/85.9, 85.11, 85.8, 95.2

[56] References Cited

U.S. PATENT DOCUMENTS

| | | | |
|---|---|---|---|
| 4,313,196 | 1/1982 | Oblonsky | 370/85.8 |
| 4,435,706 | 3/1984 | Callan | 340/825.08 |
| 4,595,921 | 6/1986 | Wang et al. | 340/825.08 |
| 4,675,864 | 6/1987 | Bliek et al. | 370/85.8 |
| 4,779,092 | 10/1988 | Takao | 340/825.52 |
| 4,829,297 | 5/1989 | Ilg et al. | 340/825.08 |

Primary Examiner—Donald J. Yusko
Assistant Examiner—Edwin C. Holloway, III
Attorney, Agent, or Firm—Wegner & Bretschneider

[57] ABSTRACT

A polling system for use in an audio system in which a plurality of controllers for controlling a plurality of input/output devices of the audio system and a system controller for controlling the status of the plurality of controllers are connected via a bus line. In an initial polling operation upon power-up of the system, the system controller in order confirms the connection of the plurality of controllers to the system and stores the results of confirmation. When the absence of connection of the controllers is confirmed in the initial polling operation, the system controller further monitors the level on a transmission line provided in the bus line for transmitting a requesting signal from the plurality of controllers to the system controller, and performs the polling operation once more if the presence of the requesting signal is confirmed.

3 Claims, 6 Drawing Sheets

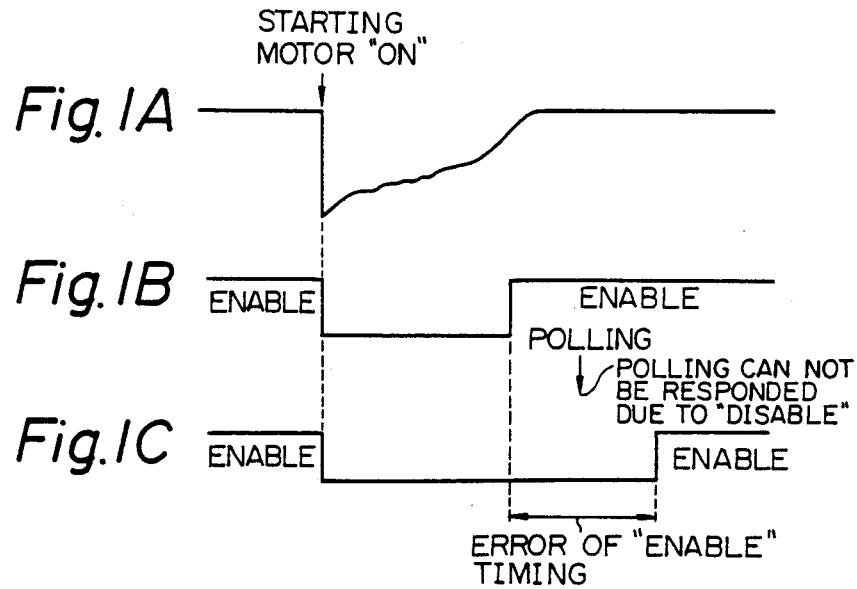
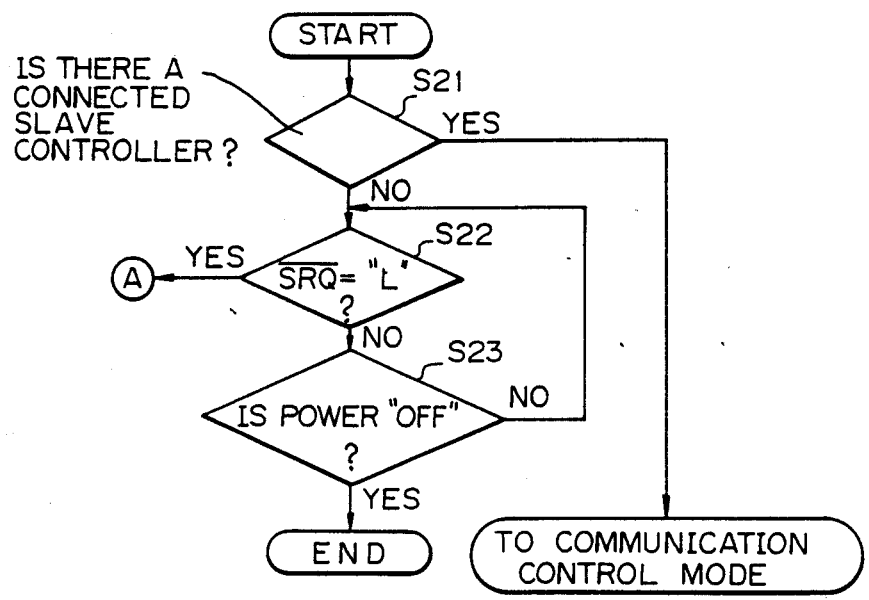

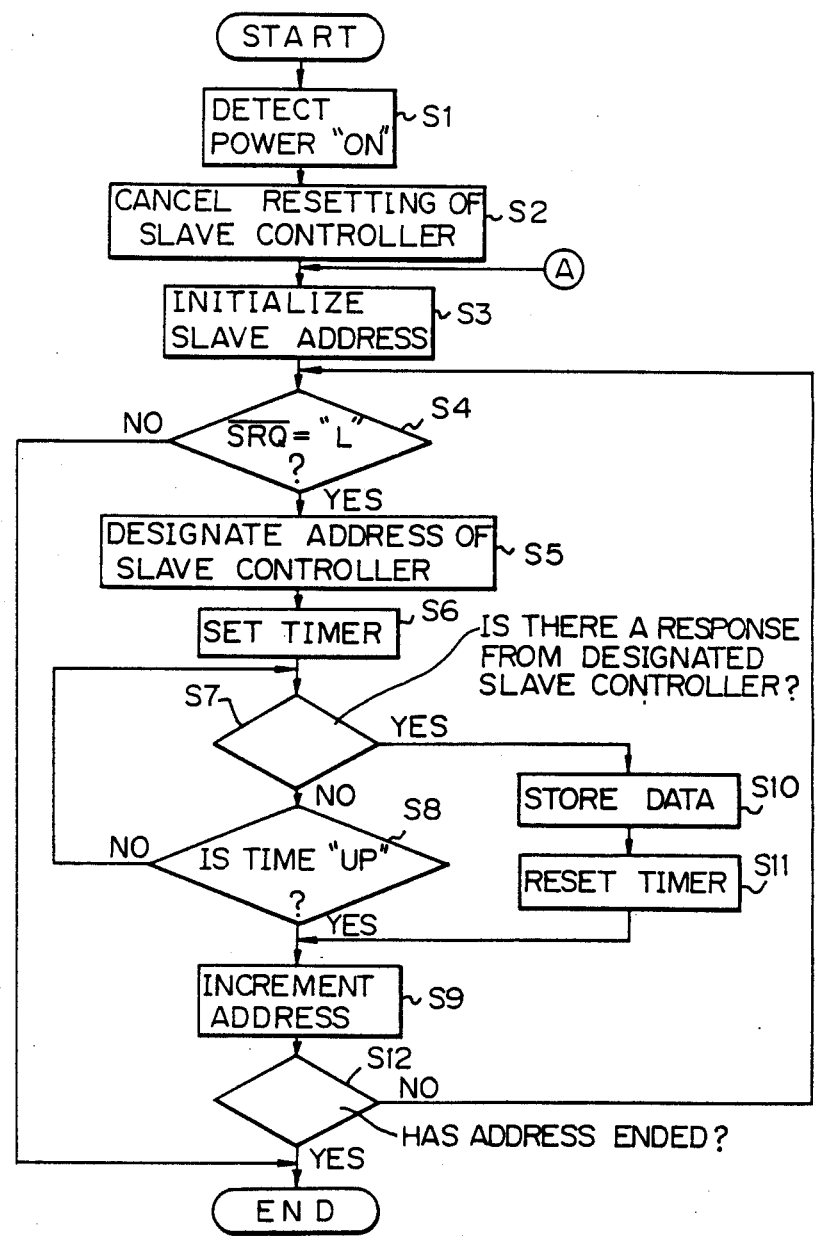

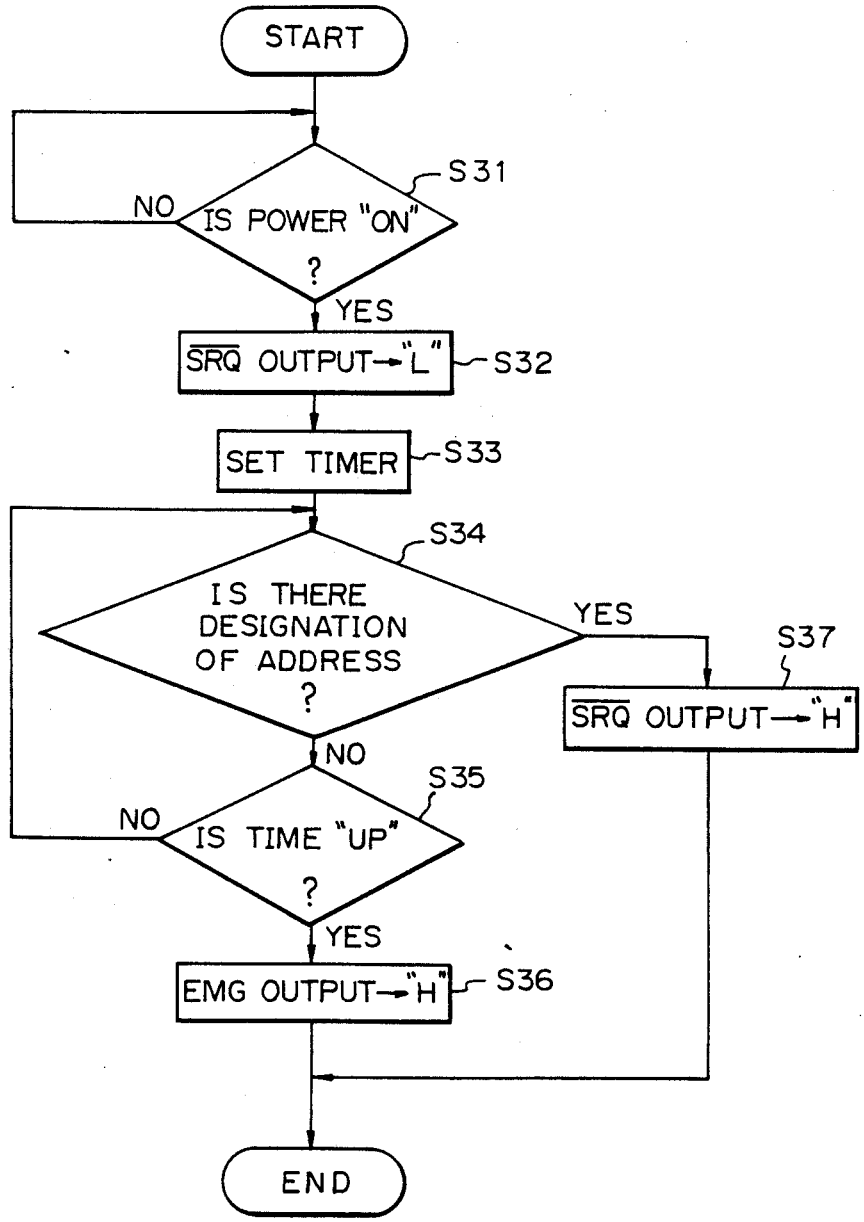

POLLING SYSTEM FOR USE IN AN AUDIO SYSTEM

BACKGROUND OF THE INVENTION

1. Field of the Invention

The present invention generally relates to a polling system for use in an audio system, and particularly relates to a polling system for confirming the status of connection of a plurality of controllers to a system controller, which controllers respectively control a plurality of I/O (input and output) devices.

2. Description of Background Information

There are audio systems made up of a plurality of I/O devices (or components), and configured such that a plurality of controllers for controlling each of the I/O devices (hereinafter referred to as slave controllers) are connected, via a bus line, to a system controller for performing the management of the state of such slave controllers, so that bi-directional communications are enabled through the bus line.

In such audio systems, the system controller performs a polling operation via the bus line upon power-up of the system by the throw-in of a power current in such a manner that the status of connection of the slave controller to the bus line is checked respectively, and the result of the check is stored so that communication is performed afterwards only between the system controller and the slave controllers whose connection to the system controller has been confirmed.

Through the initial polling operation at the time of the power-up of the system, if it is judged that no slave controller is connected, it generally means that the control of communication is unnecessary. So, a procedure is performed to restrict the operation so that the control of communication would not be performed.

However, if the system is designed such that completely no control of communication is performed subsequently when it is judged that no slave controller is connected through the initial polling operation, it is not possible to know the presence of a slave controller if the slave controller is connected after the judgment of the connection.

On the other hand, in the case of the audio system mentioned above, as many as 15 I/O devices can be connected, and addresses $01_H$–$0F_H$ are respectively allotted to the slave controllers of the devices. Upon power-up of the system, the system controller performs the polling operation via the bus-line, so that the connection of slave controllers to the bus line is checked and the result is stored. After this operation, communication is performed only between the system controller and slave controllers whose connection to the system controller has been confirmed. This polling operation begins starts with the designation of address to the slave controller from the lowest address ($01_H$), and the connection of the slave controller is confirmed by checking whether or not a response from the slave controller is received within a certain time period. Subsequently, the address is incremented, and the same process is repeatedly performed until the last address ($0F_H$) is reached.

As mentioned above, with the conventional polling system the status of connection of the slave controller is checked by sequentially designating the address from the address $01_H$ to the address $0F_H$. Therefore, it has been necessary to check the status of connection with respect to all addressed even if no slave controller is connected to the system controller. Thus, there has been a problem that a period is required for the polling operation.

On the other hand, this type of audio system may be, for example, mounted in a vehicle. FIGS. 1A through 1C illustrate the operation of the system under such a condition. If each of the slave controllers has a means for detecting on/off status of the power supply, the operation of the slave controller can be stopped by a drop of the power voltage as illustrated during the operation of a staring motor of the vehicle, as illustrated in FIG. 1A. In such a case, if start of the operation of one of the slave controllers is delayed as illustrated in FIG. 1C with respect to timing of initial polling operation of the system controller which is illustrated in FIG. 1B, for example due to variation in the start time from one slave controller to another, that slave controller would be regarded not existing. Afterwards, that slave controller would be considered not being connected.

OBJECTS AND SUMMARY OF THE INVENTION

The present invention is based on the recognition of the above point, and an object of the present invention is to provide a polling system for use in an audio system in which reconfirmation of the state of connection of slave controllers is enabled after the completion of the initial polling operation.

Another object of the present invention is to provide a polling system for use in an audio system in which the period required for the polling operation can be shortened.

A still further object of the present invention is to provide a polling system for used in an audio system in which omission of a slave controller from the system during the initial polling operation can be avoided.

According to the present invention, a polling system is used in an audio system having, in a bus line, a transmission line for controlling transmission of a predetermined requesting signal from a plurality of slave controllers to a system controller, and when the absence of connection of slave controllers is confirmed by an initial polling operation, the polling system monitors the presence or absence of the predetermined requesting signal on the transmission line and performs the polling operation one more time if the presence of the requesting signal is confirmed.

According to another aspect of the invention, a polling system is used in an audio system having a transmission line pulled to a high level in a bus line and a plurality of controllers each of which sets its output level to the transmission line to a low level upon starting of a polling operation and raises it to the high level in response to a confirming signal of the presence or absence of its connection to a system controller, the polling system monitors the level on the transmission line in order during the polling operation, and finishes the polling operation when the level on the transmission line has turned to the high level. In the above expression, the high and low levels stand for high and low states in electric potential.

According to a further aspect of the present invention, the polling system is used in an audio system including a plurality of input/output devices each of which has a means for detecting on/off conditions of a power supply, the polling system is adapted such that each of a plurality of slave controllers measures the time elapsed after power-up of the corresponding one of the input/output devices, and it requests the polling operation to a system controller when a confirming signal of the presence or absence of its connection to the system controller is not supplied within a predetermined time period after the power-up of the input/output device.

BRIEF DESCRIPTION OF THE DRAWINGS

FIGS. 1A through 1C are waveform diagrams showing the operation of the system during the operation of a starting motor of a vehicle on which the audio system is mounted;

FIGS. 5 through 8 are flowcharts respectively showing processing steps of the polling system according to the present invention.

DETAILED DESCRIPTION OF PREFERRED EMBODIMENTS

The embodiment of the present invention will be described with reference to the accompanying drawings.

Figure 2:
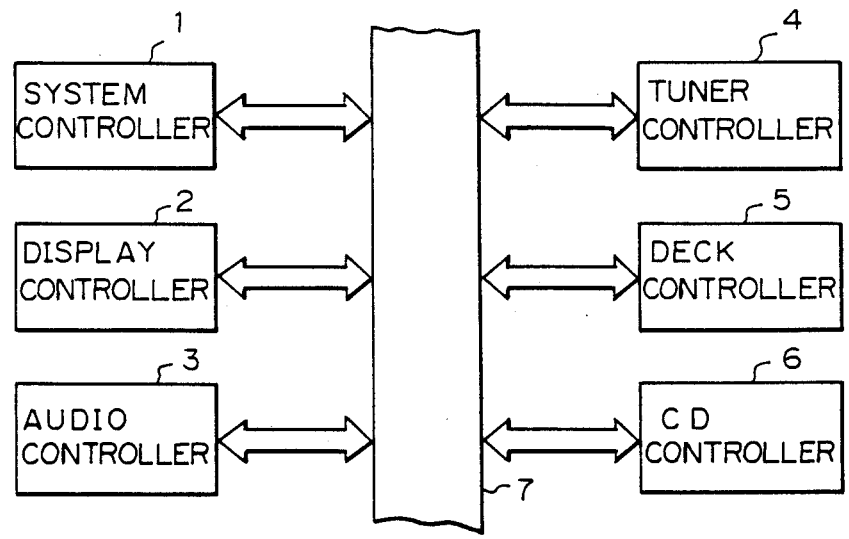
FIG. 2 is a block diagram of an audio system in which the polling system according to the present invention is adopted.
Figure 4:
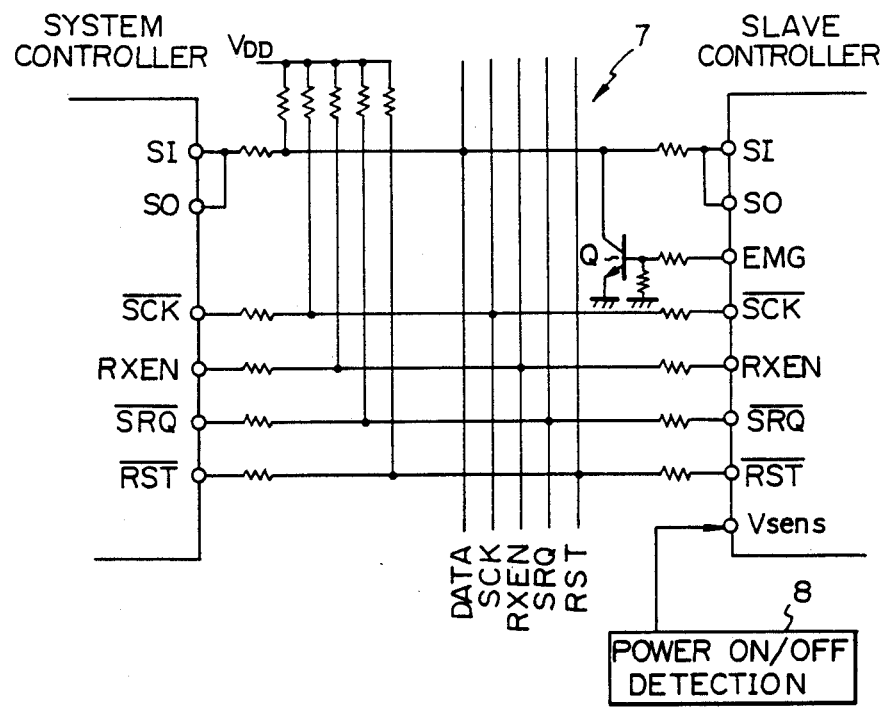
FIG. 4 is a circuit diagram showing another example of the construction of the data bus line of the system shown in FIG. 2.

FIG. 2 is a block diagram showing the basic construction of an audio system in which the polling system according to the present invention is utilized. This audio system includes, as plurality of I/O devices, source units such as an FM/AM tuner, a cassette tape deck, a CD (compact disc) player, an audio unit for selectively processing audio signals from the source units, and a display for displaying the operating state of the audio unit. As illustrated in FIG. 4, these I/O devices may respectively include a power on/off detection circuit 8.

As shown, the audio system is provided with a system controller 1 which performs control of the whole system, a display controller 2 for performing control of the display unit, an audio controller for performing control of the audio unit, controllers 4 through 6 for performing control of the FM/AM tuner, the cassette tape deck, and the CD player, respectively. These controllers are connected via a data bus line 7. As many as I/O devices can be connected, and addresses $01_H$ through $0F_H$ are allotted to the controllers respectively.

Figure 3:
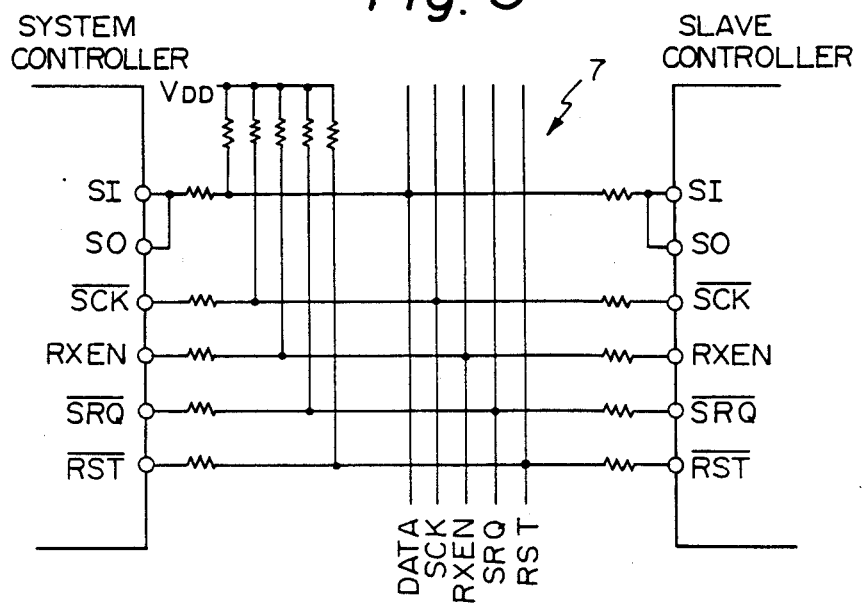
FIG. 3 is a circuit diagram showing the construction of the data bus line of the system shown in FIG. 2.

As shown in FIG. 3, the data bus line 7 consists of 5 lines, namely, shift lock line $\overline{SCK}$ for synchronization, 8-bit unit data line DATA, reception enable/disable status line RXEN, service request line $\overline{SRQ}$, and hard reset line $\overline{RST}$. The data line DATA is connected to data input and output ports of each controller through resisters, and other lines are connected to corresponding ports of each controller through registers. Each line is pulled up by the connection to a positive power source $+V_{DD}$. By using this data bus line 7, communications between the controllers are performed.

The controllers use the bus line 7 in common in a time-division fashion. In principle, data communication is performed with the system controller in any one of slave controllers. All data have a sign indicating as to which slave controller the data is to be directed, and only the designated slave controller decodes and in turn processes the data. The designated slave controller invariably sends a response to the system controller.

Conversely, when the slave controller sends the data to the system controller, the slave controller pulls the line level of the service request line $\overline{SRQ}$ to a low level (referred to as L hereinafter). When the system controller 1 detects this, it starts the polling operation by which it communicates with the slave controllers 2 through 6 in order, so as to judge which slave controller is disposed to send the data. Also in this case, all of the slave controllers 2 through 6 invariably send back a response. When the order comes, the slave controller which actually requested the service turns the line level of $\overline{SRQ}$ to a high level (referred to as H hereinafter), and transmits the data to be send together with the response. Through the procedure explained above, the system controller 1 and the slave controllers 2 through 6 perform the communication between them only when it is necessary.

As illustrated in FIG. 4, each of the plurality of slave controllers 2 through 6 may have, in addition to the port connected to the bus line, a Vsense input port for receiving a detection output from the power on/off detection circuit 8 provided in corresponding input/output device, and an EMG output port which generates an H level signal when an address designation in the polling operation which will be described later within a predetermined time period after the power-up. To the EMG output port, a transistor Q is connected at the base thereof via a register. The collector of the transistor Q is connected to the DATA line, and its emitter is connected to ground. The transistor Q of each slave controller turns on in response to the EMG output of H level, to ground the DATA line, so as to notify to the system controller that there was no address designation in the polling operation is within the predetermined time period after the power-up.

In the audio system constructed as explained above, the system controller 1 performs the polling operation via the bus line 7 upon power-up of the system, so that the status of the connection of the slave controllers to the bus line 7 is confirmed and the results are stored. Afterwards, communication control is performed only for the slave controllers whose connection has been confirmed.

The processing steps of the polling system according to the present invention which are performed by the system controller 1 will be further explained with reference to the flowchart of FIG. 5.

At first, the system controller 1 removes the resetting of the slave controllers 2 through 6 (step S2) upon detection of the power-up of the system at step S1. In response to this resetting, each of the slave controllers 2 through 6 turns its service request output $\overline{SRQ}$ to the L level. Subsequently, the system controller 1 performs the initialization of slave address by setting a low address $01_H$ (step S3), and confirms that the line level of the service request line $\overline{SRQ}$ is at the L level (step S4). Subsequently, the system controller 1 performs the designation of address for one slave controller (step S5), and sets a timer of a predetermined period (200 mseconds for example) at the same time (step S6). Then the system controller judges as to whether or not a response has arrived from the slave controller to which the address designation was effected (step S7). If it is judged that there is no response, the system controller waits the response until a time-up of the time which has been set previously (step S8). The slave controller to which the address designation has been effected sends the response to the system controller 1 by setting the service request output $\overline{SRQ}$ at the H level.

If there is no response within the predetermined period, it is then judged that the slave controller is not connected to the bus line 7, and the designated address is incremented by one (step S9). If it is detected in step S7 that there is a response, it is considered that the slave controller is connected to the bus line, and the system controller stores a characteristic data of the slave (data indicating whether it is an audio source or not, etc.) together with the address into an incorporated memory (step S10). Subsequently, the system controller resets the timer which has been set beforehand (step S11), and proceeds to step S9 so as to increment the designated address. Subsequently, the system controller judges as to whether or not the slave address has ended (step S12). If it has not ended, the system controller 1 goes back to step S4 to repeat the operations described above. If, on the other hand, if the slave address has ended, the initial polling operation upon power-up of the system by turning-on of the power supply is finished.

In addition, if it is detected that the line level of the service request line $\overline{SRQ}$ is H level immediately after the initialization of the slave address, the initial polling operation is finished at that instant as it is regarded that no slave controller is connected to the bus line 7. Although the line level of the service request line $\overline{SRQ}$ is at the L level upon starting of the initial polling operation, it shifts to the H level when the address is designated for all of the slave controllers connected to the bus line 7. Therefore, it can be judged that the designation of address has competed for all of the slave controllers connected to the bus line 7.

Now, the steps of processing after the initial polling operation will be explained with reference to the flowchart of FIG. 6.

As shown, the system controller 1 judges as to whether or not there is any slave controller connected to the bus line 7 (step S21). If there is at least one slave controller connected to the bus line 7, the system controller 1 proceeds to a mode for performing communication control for that slave controller. If, on the other hand, there is no slave controller connected to the bus line 7, the system controller 1 monitors as to whether or not the line level of the service request line $\overline{SRQ}$ has shifted to the L level (step S22). If the level shift of the line level is detected, the system controller 1 goes back to the step S3 shown in FIG. 5, to perform the above described polling operation once more, so that the presence or absence of the connection of the slave controller to the system controller 1 is confirmed once more. This monitoring of the line level of the service request line $\overline{SRQ}$ is repeatedly performed until the power-off is detected at step S23.

In other words, the shift of the line level of the service request line $\overline{SRQ}$, after confirming that no slave controller is connected via the initial polling operation, means that the slave controller is connected to the bus line, and the requesting signal (L level) for requesting the transmission of the data is issued from the slave controller to the system controller 1. Therefore, it is possible to check as to whether or not the slave controller is connected to the bus line, by monitoring the line level of the service request line $\overline{SRQ}$. Then, by performing the polling operation once more, the omission of the slave controller connected to the bus line can be surely prevented.

With the feature described above, the presence of the slave controller which is connected to the bus line is surely recognized even in the event that the slave controller is connected after the initial polling operation by which it has been judged that no slave controller is connected, or in an on vehicle audio system the start of the operation of each slave controller was not in time for the initial polling operation because of a temporary stopping of its operation due to a voltage drop of power supply by the operation of a starting motor.

As explained in the foregoing, according to the first aspect of the present invention, the polling system monitors the presence or absence of the requesting signal on one transmission line in the bus line if it was detected via the initial polling operation that no slave controller is connected. The polling system performs the polling operation once more when the presence of the requesting signal is detected, so that the presence of the slave controller connected to the bus line is surely recognized.

Referring again to the flowchart of FIG. 6, the second feature of the present invention will be explained. As shown, whether or not the slave address has ended is detected in step S12 and, the program returns to step S4 if the slave address has not ended. If it is judged, in step S4, that the line level of the service request line $\overline{SRQ}$ is at the H level, then the system controller finishes the initial polling operation upon power-up of the system by the throw-in of the power current. If the line level is at the L level, the above-described operation will be repeated. If it is judged, in step S12, that the slave address has ended, the system controller finishes the initial polling operation without doing any further steps.

Thus, whether or not there is an unrecognized slave controller is checked by monitoring in order the line level of the service request line $\overline{SRQ}$ during the initial polling operation. With this feature, it becomes unnecessary to confirm the presence or absence of the connection for all of the addresses. Thus, it becomes possible to shorten the time required for the initial polling operation.

As explained in the foregoing, according to the second feature of the present invention, the polling system monitors in order the level on one transmission line in the bus line, to check the presence of an unrecognized slave controller. Therefore it becomes unnecessary to confirm the presence or absence of the connection for all of the addresses, and the time required for the initial polling operation can be shortened.

Figure 7:
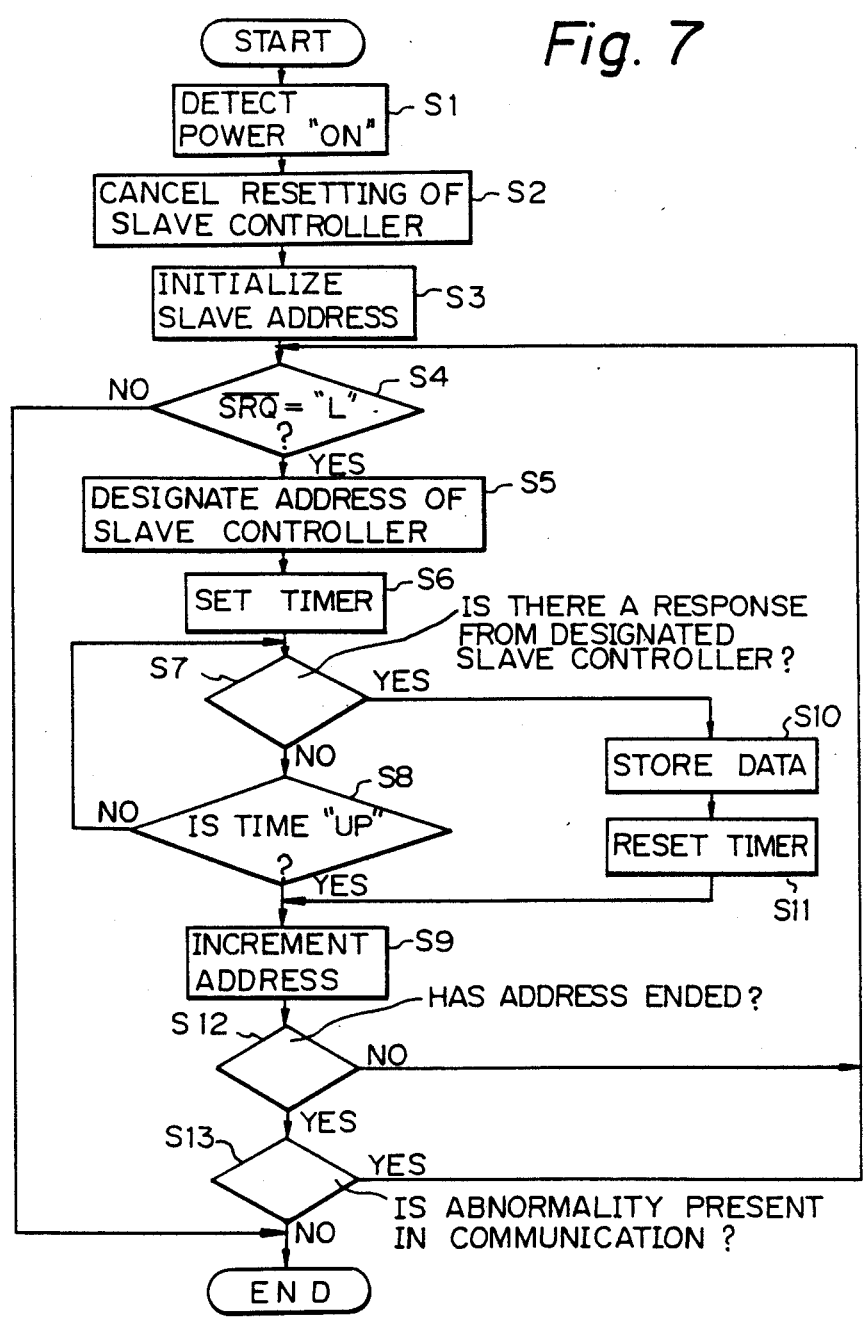

Referring to the flowcharts of FIGS. 7 and 8, the third feature of the present invention will be explained. As shown in FIG. 7, the steps S1 through S12 in this flow of operation is the same as the steps S1 through S12 in FIG. 5. If it is judged in step S12 that the slave address has ended, the system controller 1 judges as to whether or not an abnormality is present on the communication via the DATA line (step S13). If there is an abnormality on the communication via the DATA line, then the system controller 1 judges that it is a request of the polling operation by a disturbance of the communication from any one of the slave controllers. In that case, the system controller 1 goes back to step S4 to perform the polling operation once more. If there is no abnormality on the communication, the system controller completes the initial polling operation through the system power-up upon turning-on of the power supply.

Now, the steps of processing in the polling operation performed by each of the plurality of slave controllers will be explained with reference to the flowchart of FIG. 8.

When each of the slave controllers detects the power-on of the corresponding input/output device by the detection output of the power on/off detection circuit 8 mounted on the corresponding input/output device (step S31), it turns the output of the service request $\overline{SRQ}$ to the L level (step S32) and at the same time it sets the timer of the predetermined time period (step S33). Then each of the slave controllers judges (step S34) as to whether or not the address of itself has been designated by detecting as to whether or not a confirming signal is supplied from the system controller 1. If the address of the slave controller is not designated, it waits the address designation until the time period which has been set in the timer has elapsed (step S35). If the address designation is not performed within the predetermined time period, the slave controller turns the EMG output to the H level (step S36). With this operation, the transistor Q shown in FIG. 4 turns-on, to connect the DATA line to ground. That is, each of the slave controllers turns the DATA line to the L level when the address of itself is not designated within the predetermined time period after the throw-in of the power current, so that it requests another polling operation to the system controller by disturbing the communication between the system controller 1 and other slave controller via the DATA line. If it is detected in step S34 that the address is designated, the slave controller sends a response to the system controller by turning the service request output $\overline{SRQ}$ to the H level.

As describe above, each of the slave controllers requests the polling operation once more if its address is not designated within the predetermined time period after starting (turning-on) of the power supply to the corresponding input/output device. With this feature, even if the operation of each slave controller is not started in time for the initial polling operation, for example, due to a temporary ceasing of the operation by the drop of the power voltage during the operation of a starting motor in the case of an on-vehicle audio system, the presence of slave controllers connected to the system is surely acknowledged by the second polling operation. In this way, omission of the slave controller from the system can be avoided.

In the embodiment described above, the second polling operation is requested to the system controller 1 by grounding the DATA line. However, it is also possible to arrange the system such that the shift lock line $\overline{SCK}$ for synchronization is grounded for the same purpose, and the same result can be attained in such a case.

As explained above, according to the third feature of the present invention the polling system is configured such that a second polling operation is requested to the system controller if the address of each of the slave controller is not designated within a predetermined time period after the starting of the power supply in the corresponding input/output device. Thus, by the second polling operation, the slave controllers connected to the system controller are prevented from being omitted from the system.

What is claimed is:

1. A polling system for use in an audio system having a plurality of input/output devices, said polling system comprising:
   a plurality of controllers for controlling said plurality of input/output devices;
   a system controller for performing status control of said plurality of controllers; and
   a bus line for connecting said plurality of controllers and said system controller so that a mutual communication among said plurality of input/output devices is enabled in said audio system via said bus line, wherein said system controller performs an initial polling operation upon power-up of the audio system, in which presence or absence of connection of each of said plurality of controllers to said system controller is confirmed in order and results of the confirmation are stored, said bus line includes a transmission line for transmitting a predetermined requesting signal from each of said controllers to said system controller, and said system controller monitors presence or absence of said predetermined requesting signal when the absence of the connection of at least one of said controllers is confirmed via said initial polling operation, and performs the polling operation once more when the presence of said requesting signal is confirmed.

2. A polling system for use in an audio system having a plurality of input/output devices, said polling system comprising:
   a plurality of controllers for controlling said plurality of input/output devices;
   a system controller for performing status control of said plurality of controllers; and
   a bus line for connecting said plurality of controllers and said system controller so that a mutual communication among said plurality of input/output devices is enabled in said audio system via said bus line, wherein said system controller performs a polling operation in which presence or absence of connection of each of said plurality of controllers to said system controller is confirmed in order and results of the confirmation are stored, said bus line includes a transmission line of normally high level, and each of said plurality of controller sets the level of its output to said system controller at a low level at the time of starting of said polling operation, and said system controller in order monitors the level on said transmission line during said polling operation, and finishes said polling operation when said output level has returned to the high level.

3. A polling system for use in an audio system having a plurality of input/output devices, said polling system comprising:
   a plurality of controllers for controlling said plurality of input/output devices;
   a system controller for performing status control of said plurality of controllers; and
   a bus line for connecting said plurality of controllers and said system controller so that a mutual communication among said plurality of input/output devices is enabled in said audio system via said bus line, wherein said system controller performs a polling operation in which presence or absence of connection of each of said plurality of controllers so said system controller is confirmed in order by supplying a confirming signal to each of said plurality of controllers, each of said input/output devices includes means for detecting on/off state of a power supply and each of said plurality of controllers measures the time elapsed after power-up of corresponding one of said input/output devices, and each of said plurality of controllers requests said polling operation to the system controller if said confirming signal is not supplied within a predetermined time period after the power-up of the input/output device.

* * * * *